(12) United States Patent
Fujieda et al.

(10) Patent No.: US 8,964,001 B2
(45) Date of Patent: Feb. 24, 2015

(54) METHOD FOR DISPLAYING MEASUREMENT EFFECTIVE AREA IN THREE-DIMENSIONAL VISUAL SENSOR AND THREE-DIMENSIONAL VISUAL SENSOR

(75) Inventors: Shiro Fujieda, Kyoto (JP); Atsushi Taneno, Kusatsu (JP); Reiji Takahashi, Kyoto (JP); Masanao Yoshino, Nagaokakyo (JP); Kenichi Ukai, Kusatsu (JP)

(73) Assignee: Omron Corporation., Kyoto (JP)

( * ) Notice: Subject to any disclaimer, the term of this patent is extended or adjusted under 35 U.S.C. 154(b) by 721 days.

(21) Appl. No.: 12/915,667

(22) Filed: Oct. 29, 2010

(65) Prior Publication Data

US 2011/0122231 A1    May 26, 2011

(30) Foreign Application Priority Data

Nov. 24, 2009  (JP) ................. 2009-266778

(51) Int. Cl.
*H04N 13/02* (2006.01)
*G06T 7/00* (2006.01)
*H04N 13/00* (2006.01)

(52) U.S. Cl.
CPC ............ *G06T 7/0046* (2013.01); *G06T 7/0075* (2013.01); *G05B 2219/37017* (2013.01); *H04N 13/0239* (2013.01); *H04N 13/0242* (2013.01); *H04N 2013/0081* (2013.01); *G06T 2200/24* (2013.01); *G06T 2207/10012* (2013.01); *G06T 2207/10028* (2013.01); *G06T 2207/30164* (2013.01)
USPC .......................................... 348/47

(58) Field of Classification Search
None
See application file for complete search history.

(56) References Cited

U.S. PATENT DOCUMENTS

| | | | |
|---|---|---|---|
| 2005/0151839 A1* | 7/2005 | Ito et al. ................... | 348/51 |
| 2006/0285752 A1 | 12/2006 | Fujieda et al. | |
| 2008/0019683 A1* | 1/2008 | Yu et al. .................. | 396/121 |
| 2009/0059242 A1 | 3/2009 | Fujieda et al. | |

FOREIGN PATENT DOCUMENTS

| | | |
|---|---|---|
| JP | 2006-349586 | 12/2006 |
| JP | 2009-053147 | 3/2009 |

* cited by examiner

*Primary Examiner* — Jorge L Ortiz Criado
*Assistant Examiner* — Kate Luo
(74) *Attorney, Agent, or Firm* — Foley & Lardner LLP

(57) ABSTRACT

One of stereo cameras is set such that a front view of a support surface of a workpiece is imaged, an image produced by the camera is displayed, and a range of an area where measurement processing is enabled is assigned by a rectangular frame. A manipulation assigning an upper limit and a lower limit of a height measurement range is accepted. When each assignment is fixed, zero is set as a z-coordinate to each constituent pixel of an image to which the rectangular frame is set, and a z-coordinate based on the upper limit of the height measurement range and a z-coordinate based on the lower limit are set to coordinates corresponding to the rectangular frame. Perspective transformation of three-dimensional information produced by the setting is performed from a direction of a line of sight set by a user, a produced projection image is displayed on a monitor.

4 Claims, 7 Drawing Sheets

METHOD FOR DISPLAYING MEASUREMENT EFFECTIVE AREA IN THREE-DIMENSIONAL VISUAL SENSOR AND THREE-DIMENSIONAL VISUAL SENSOR

CROSS-REFERENCE TO RELATED PATENT APPLICATIONS

Japan Priority Application 2009-266778, filed Nov. 24, 2009 including the specification, drawings, claims and abstract, is incorporated herein by reference in its entirety.

BACKGROUND OF THE INVENTION

1. Technical Field

The present invention relates to a technology of displaying a setting state of an area where measurement processing is enabled in a three-dimensional sensor in which a measurement target (hereinafter, occasionally referred to as "workpiece") and a support surface of the measurement target are imaged with a stereo camera to perform three-dimensional measurement of the measurement target using a produced stereo image.

2. Related Art

The three-dimensional visual sensor includes a function of restoring three-dimensional information on a target by stereo measurement and a function of matching the restored three-dimensional information with previously registered three-dimensional model to recognize a position and an attitude of the target. The three-dimensional visual sensor is used to recognize a component that is a grasping target of a picking robot or to inspect a component or a shape of a completed product.

The applicant developed a general-purpose three-dimensional visual sensor, in which a measurement condition is easily changed depending on the intended use and set contents and processing result can be confirmed on an easy-to-understand screen. For example, Japanese Unexamined Patent Publication Nos. 2006-349586 and 2009-53147 disclose the confirmation display.

In the technique disclosed in Japanese Unexamined Patent Publication No. 2006-349586, after calibration of a stereo camera is performed, a height range to be measured is assigned by a user, a range which is located within the assigned height range and in which a point included in visual fields of all the cameras is projected is determined in each camera, and an image expressing the ranges is displayed. In the display of the technique disclosed in Japanese Unexamined Patent Publication No. 2006-349586, the user can easily confirm whether the stereo cameras are set in a state in which the height range assigned by the user can be measured.

In the technique disclosed in Japanese Unexamined Patent Publication No. 2009-53147, after a z-coordinate of a processing target region is measured with a plurality of cameras including a camera that is set such that the front view of the support surface of the workpiece is imaged, the measured z-coordinate is set to a pixel corresponding to the processing target region in the front view image while zero is set to other pixels as the z-coordinate, and perspective transformation of a three-dimensional pixel distribution generated by the settings is performed to display a produced projection image. In the display of the technique disclosed in Japanese Unexamined Patent Publication No. 2009-53147, even if part of the measurable range is set to the processing target region, the measurement result can be displayed while correlated with an image around the processing target region. Therefore, the user can easily recognize the measurement result.

In the site where the three-dimensional visual sensor is introduced, occasionally an area where the measurement result becomes effective is set from the range where the stereo measurement can be performed. For example, when the three-dimensional visual sensor is used to control the picking robot, the effective area is set such that a location where a robot arm is difficult to be extended or a location where the robot is possibly broken when the robot arm is extended are excluded. When the three-dimensional visual sensor is used for the purpose of inspection, the effective area is set such that a location having no possibility that the inspection target region exists is excluded. When the effective area is set, the recognition result of the region out of the effective area is not outputted.

In order to set the effective area, generally the measurable area is imaged to display the produced image, and a manipulation assigning the range to which the effective area should be set on the display screen. When the range of the effective area is determined on the support surface of the target by the above assignment, three-dimensional information on the effective area is derived based on measurement parameters determined by the calibration, and the three-dimensional information is registered in a memory of the three-dimensional visual sensor.

Occasionally, a range in a height direction of the effective area is determined by accepting the assignment of the measurement range in the height direction.

However, because a size of the image projected to an imaging surface of the camera is decreased as the imaging target is moved farther away from the viewpoint of the camera, it is difficult for the user to recognize how much the set effective area spreads or whether the spread range is proper. The problem is likely to be solved when the effective area can be displayed in the three-dimensional manner along with the measurement target space. However, in order to realize such display, it is necessary to measure pieces of three-dimensional information on all the constituents included in the measurement target space. Therefore, such display is substantially impossible.

SUMMARY

The present invention has been devised to solve the problems described above, and an object thereof is to be able to easily display the stereoscopic shape of the set effective area along with the relationship with the surroundings of the stereoscopic shape to enhance the convenience.

In accordance with one aspect of the present invention, a method for displaying a setting state of an area where measurement processing is enabled in a three-dimensional visual sensor includes first to fourth steps.

In the first step, a position and an attitude of one of the stereo cameras is set such that a front view of the support surface of the measurement target is imaged, a two-dimensional image produced by the front view camera is displayed on a monitor, a manipulation assigning a range in the support surface of an effective area of the measurement processing is accepted on the displayed image, and an input of a numerical value indicating a height range of the measurement target is accepted.

In the second step, a specific coordinate corresponding to one numerical value in the height range accepted in the first step is set to each pixel constituting the two-dimensional image produced by the front view camera as a z-coordinate, and three-dimensional information is produced by setting a z-coordinate based on an upper limit of the height range and a z-coordinate based on a lower limit to each of a plurality of coordinates indicating the effective area assigned by the range assigning manipulation.

In the third step, a manipulation assigning a direction of a line of sight with respect to the three-dimensional information is accepted, and a projection image is produced by performing perspective transformation of the three-dimensional information from the direction assigned by the manipulation. In the fourth step, the projection image is displayed on the monitor.

In the second step of the above method, for example, the z-coordinate expressing the height of the support surface of the measurement target can be set to each constituent pixel of the two-dimensional image produced by the front view camera. The values in which the upper limit and lower limit of the height range inputted by the user are divided by the magnification of the camera coordinate system can be set as the z-coordinate to the coordinate indicating the effective area. With the above settings, the three-dimensional information expressing the plane corresponding to the original image and the three-dimensional information indicating the area and height of the effective area are disposed in the camera coordinate system of the front view camera while the positional relationship in the original image is maintained.

When the perspective transformation of the three-dimensional information produced through the processing is performed from the direction of the line of sight different from the front view camera, the projection image in which the effective area appears in the three-dimensional manner on the plane indicated by the three-dimensional information corresponding to the original two-dimensional image. Therefore, the stereoscopic shape of the actual effective area is displayed along with the range where the effective area is set and the relationship with the surroundings while the range assigned with respect to the two-dimensional image is maintained, so that the user can easily recognize the set range of the effective area.

In a preferred embodiment of the above method, in the fourth step, the projection image is edited into an image in which a projection range of the effective area is identified and a post-editing image is displayed on the monitor. Therefore, the user can more easily recognize the projection range of the effective area.

In accordance with another aspect of the present invention, there is provided a three-dimensional visual sensor applied with the above method, the sensor in which a space including a measurement target and a support surface of the measurement target is imaged with a plurality of stereo cameras to perform three-dimensional measurement of the measurement target using a produced stereo image, the three-dimensional visual sensor including: a range assignment accepting unit that sets one of the stereo cameras as a reference camera, displays a two-dimensional image produced by the reference camera on a monitor, accepts a manipulation assigning a range in the support surface of an effective area of the measurement processing on the displayed image, and accepts an input of a numerical value indicating a height range of the measurement target; a three-dimensional information producing unit that sets a specific coordinate corresponding to one numerical value in the height range accepted by the range assignment accepting unit to each pixel constituting the two-dimensional image produced by the reference camera as a z-coordinate and produces three-dimensional information by setting a z-coordinate based on an upper limit of the height range and a z-coordinate based on a lower limit to each of a plurality of coordinates indicating the effective area assigned by the range assigning manipulation; a perspective transformation unit that accepts a manipulation assigning a direction of a line of sight with respect to the three-dimensional information and produces a projection image by performing perspective transformation of the three-dimensional information from the direction assigned by the manipulation; and a projection image display unit that displays the projection image on the monitor.

According to the above three-dimensional visual sensor, the optical axis of the reference camera is adjusted in the direction in which the front view of the support surface of the measurement target is imaged. Therefore, there can be produced and displayed the projection image in which the stereoscopic shape of the set effective area is expressed along with the setting range and the relationship with the surroundings.

When the relationship between the effective area and the measurement target is viewed by the image in which the actual measurement target is imaged after the effective area is set by the method for performing the range assignment on the image produced by the camera, since an upper portion of the elevated measurement target is imaged larger than a bottom portion, occasionally the relationship with the effective area becomes unclear. For example, occasionally the upper image is enlarged and spreads out of the effective area although the actual target falls within the effective area, or occasionally the target seems to be included in the effective area on the image because of the large upper image although the actual target is located out of the effective area. When the effective area is set using such an image, it is difficult to set the effective area within the proper range. After the setting of the effective area, occasionally the output of the recognition result is not matched with how the image is viewed, and possibly the user has a sense of mistrust.

In accordance with a preferred aspect of the present invention, the three-dimensional visual sensor further includes: a registration unit in which a three-dimensional model of the measurement target is registered; a recognition unit that recognizes a position and an attitude of the measurement target by matching three-dimensional information restored from the stereo image with the three-dimensional model; and a model projection unit that performs perspective transformation of the three-dimensional model, set to the position and attitude recognized by the recognition unit, into a coordinate system of the reference camera. The three-dimensional information producing unit sets a z-coordinate based on a height set to corresponding point in the three-dimensional model to each point of a projection image of the three-dimensional model produced by the model projection unit, and the three-dimensional information producing unit includes each post-setting point in three-dimensional information as a target of the perspective transformation processing. The projection image display unit edits the projection image produced by the perspective transformation unit into a state where the three-dimensional model in the image and the effective area are identified, and the projection image display unit displays a post-editing image on the monitor.

According to the above aspect, the projection image suitable to the measurement target in the two-dimensional image is produced by performing the perspective transformation of the three-dimensional model, transformed into the state in which the position and attitude of the measurement target are expressed, into the coordinate system of the reference camera. Further, the z-coordinate based on the height set in the original three-dimensional model is set to each point of the projection image of the three-dimensional model to perform the perspective transformation processing, thereby producing the projection image in which the position and attitude of the measurement target are expressed in the three-dimensional manner. Therefore, the user can easily recognize whether the measurement target is located inside the effective area based on the relationship between the three-dimensional model identified and displayed in the projection image and the effective area.

According to the present invention, the height range assigned by the user is applied to the effective area assigned on the image by the user, and the projection image expressed in the three-dimensional manner is displayed while the relationship between the effective area having the height information and the image used in the assignment is maintained, so that the user can easily visually confirm the size and setting range of the effective area. Therefore, the determination as to whether the effective area is proper is easily made to enhance the convenience of the three-dimensional visual sensor.

DETAILED DESCRIPTION

Figure 1:
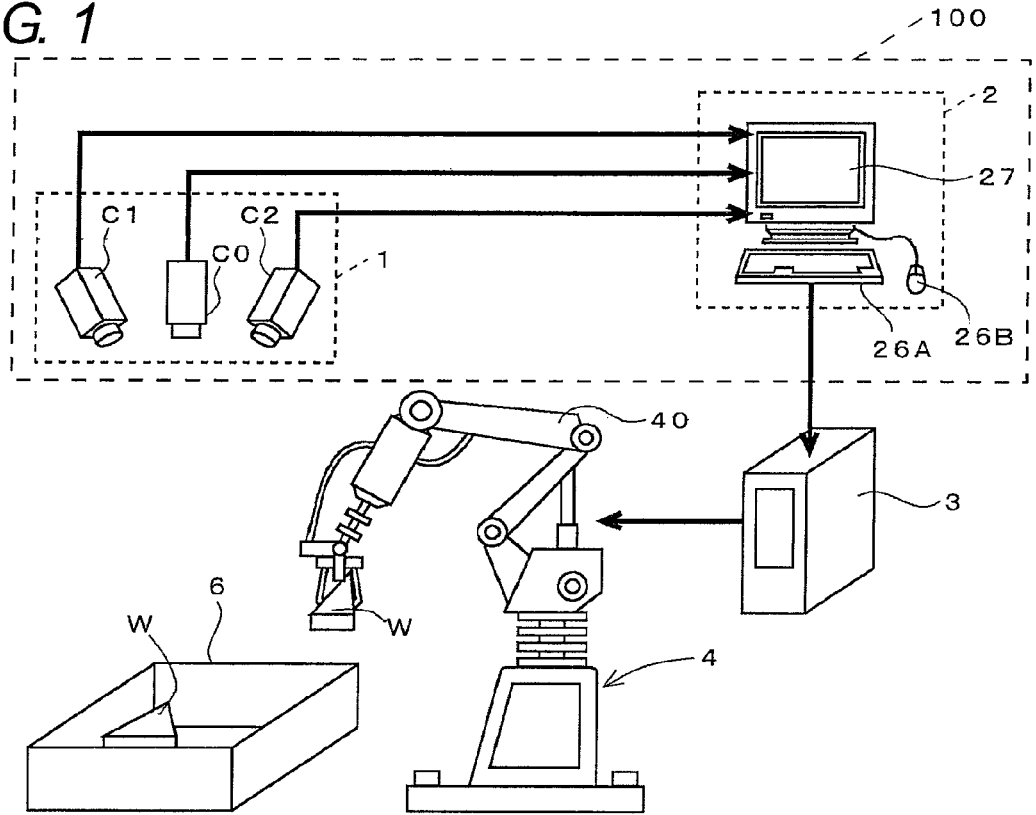
FIG. 1 is a view showing a configuration of a picking system to which a three-dimensional visual sensor is introduced.

FIG. 1 shows an example of a picking system to which a three-dimensional visual sensor is introduced.

The picking system is used to pick up a workpiece W accommodated in a container box 6 in a factory one by one to convey the workpiece W to a predetermined position. The picking system includes a three-dimensional visual sensor 100 that recognizes the workpiece W, a multijoint robot 4 that performs actual work, and a robot control device 3 that controls an operation of the robot 4.

The three-dimensional visual sensor 100 includes a stereo camera 1 and a recognition processing device 2.

The stereo camera 1 includes three cameras C0, C1, and C2. The central camera C0 is disposed while an optical axis of the camera C0 is oriented toward a vertical direction (that is, the camera C0 takes a front view image), and the right and left cameras C1 and C2 are disposed while optical axes of the cameras C1 and C2 are inclined.

The recognition processing device 2 is a personal computer in which a dedicated program is stored. In the recognition processing device 2, images produced by the cameras C0, C1, and C2 are captured to perform three-dimensional measurement aimed at an outline of the workpiece W, and three-dimensional information restored by the measurement is matched with a previously registered three-dimensional model, thereby recognizing a position and an attitude of the workpiece W. The recognition processing device 2 outputs a three-dimensional coordinate expressing the recognized position of the workpiece W and a rotation angle (expressed in each of axes X, Y, and Z) of the workpiece W with respect to the three-dimensional model to the robot control device 3. Based on the pieces of information, the robot control device 3 controls an operation of an arm 40 of the robot 4 to cause the robot 4 to grasp the workpiece W.

Figure 2:
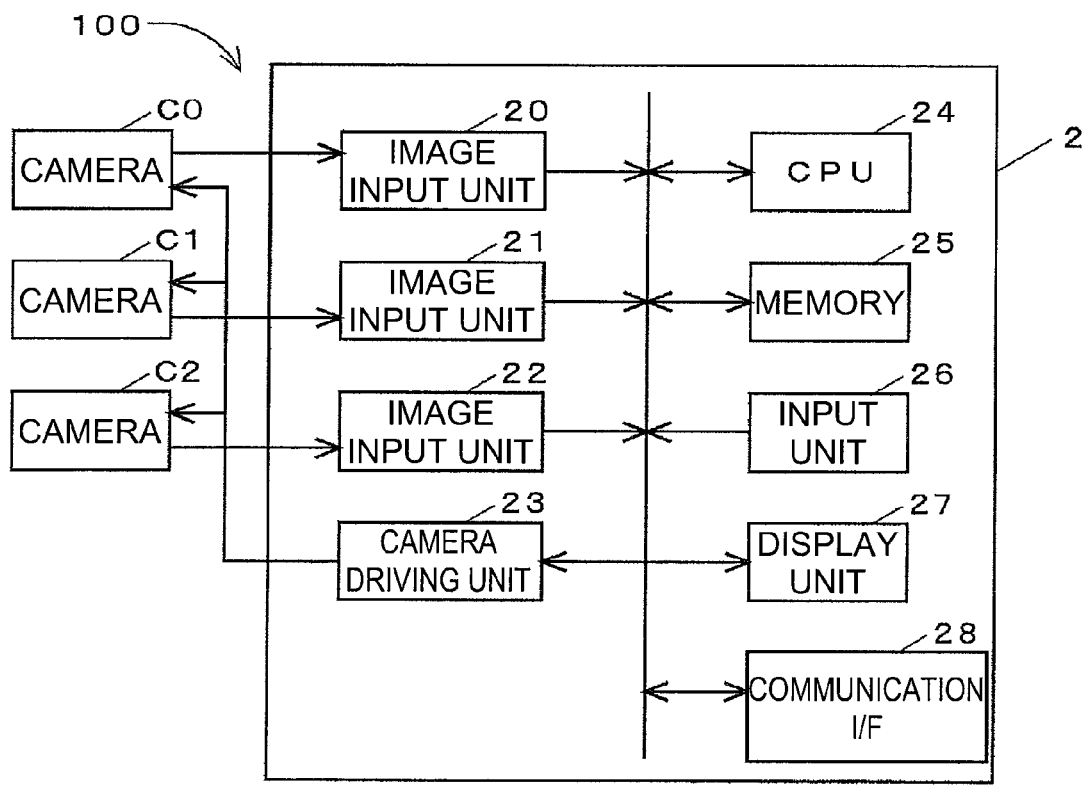
FIG. 2 is a block diagram showing an electric configuration of the three-dimensional visual sensor.

FIG. 2 is a block diagram showing a configuration of the three-dimensional visual sensor 100.

Referring to FIG. 2, the recognition processing device 2 includes image input units 20, 21, and 22 corresponding to the cameras C0, C1, and C2, a camera driving unit 23, a CPU 24, a memory 25, an input unit 26, a display unit 27, and a communication interface 28.

The camera driving unit 23 simultaneously drives the cameras C0, C1, and C2 in response to a command from the CPU 24. The images produced by the cameras C0, C1, and C2 are inputted to the memory 25 through the image input units 20, 21, and 22, respectively, and the CPU 24 performs the above-mentioned recognition processing.

The display unit 27 is a monitor device shown in FIG. 1. The input unit 26 includes a keyboard 26A and a mouse 26B, which are shown in FIG. 1. In calibration processing or in effective area setting processing described below, the input unit 26 and the display unit 27 are used to input information for setting and to display information for assisting the work.

The communication interface 28 is used to conduct communication with the robot control device 3.

The memory 25 includes a ROM, a RAM, and a large-capacity memory such as a hard disk. A program for the calibration processing, a program for producing the three-dimensional model, a program for teaching various conditions, a program for the three-dimensional recognition processing of the workpiece W, and setting data are stored in the memory 25. Three-dimensional measurement parameters computed through the calibration processing, the three-dimensional model, and the teaching data are also registered in a dedicated area of the memory 25.

In this embodiment, a three-dimensional coordinate system (hereinafter referred to as "measurement coordinate system") for stereo measurement is previously set using a calibration plate (not shown) in which a predetermined calibration pattern is drawn. Based on the program in the memory 25, the CPU 24 computes a parameter (specifically, elements $P_{00}, P_{01}, \ldots,$ and $P_{23}$ of a perspective transformation matrix of an equation (2) described below) expressing a relationship between a coordinate of the camera coordinate system and a coordinate of a measurement coordinate system in each of the cameras C0, C1, and C2, and the CPU 24 registers the parameters in the memory 25.

The CPU 24 produces the three-dimensional model of the workpiece W using CAD data and registers the three-dimensional model of the workpiece W in the memory 25. In the three-dimensional model of this embodiment, a plurality of points expressing the outline of the workpiece W are expressed by the coordinate of the three-dimensional coordinate system in which one point in the workpiece W is set to an origin. The calibration processing and the three-dimensional model registration processing are performed to enable the three-dimensional measurement and the recognition processing to be performed to the workpiece W.

In this embodiment, a user is caused to assign a range that becomes the measurement target of the three-dimensional measurement, and a three-dimensional space specified by the assignment is set as an effective area. Even after the setting, the stereo measurement is performed to a whole measurable range, and the matching processing is performed to all the measurement results using the three-dimensional model. However, the information outputted as the recognition result to the robot control device 3 is restricted to the information included in the effective area.

Figure 3:
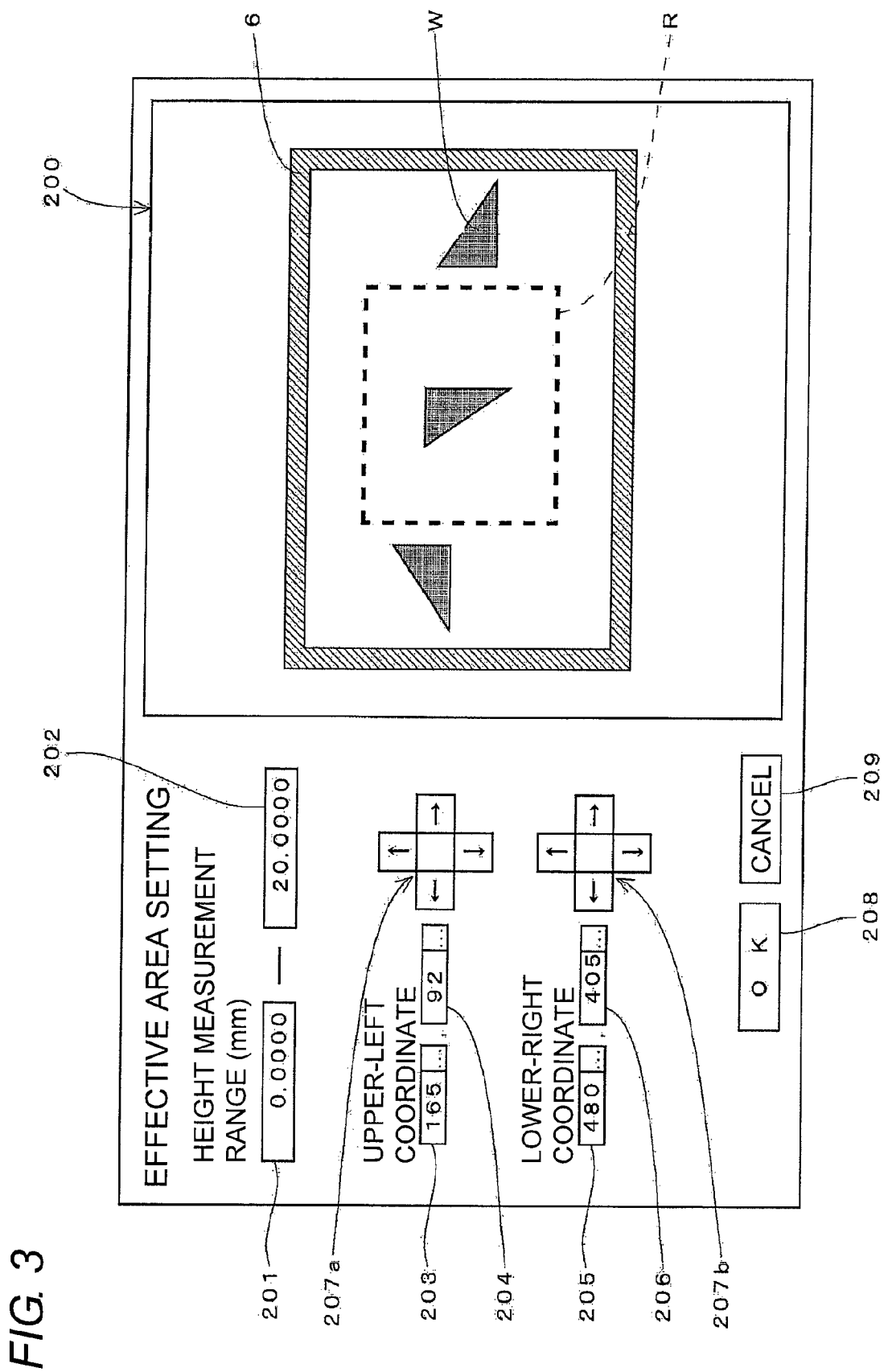
FIG. 3 is a view showing a configuration of a work screen for setting an effective area.

FIG. 3 shows a configuration of a work screen for setting the effective area. For the sake of convenience, in FIGS. 3, 4, 5, and 7, the images of the workpiece W and container box 6 are designated by the same reference numerals as those of FIG. 1.

In the work screen, an image display area 200 is provided on the right. The image (hereinafter referred to as "front view image") inputted from the camera C0 is displayed on the image display area 200, and a rectangular frame R expressing an effective area range is displayed on the image display area 200 with a predetermined color (shown by replacing the color with a dotted line in the drawings) while superimposed on the image.

On the left of the image display area 200, input boxes 201 and 202 are provided at an upper position in order to input a numerical value indicating a height range (hereinafter referred to as "height measurement range") that becomes the measurement target, and numerical display boxes 203 to 206 (an x-coordinate is displayed in the boxes 203 and 205 and y-coordinate is displayed in the boxes 204 and 206) are provided below the input boxes 201 and 202 in order to indicate x-coordinates and y-coordinates of an upper-left apex and a lower-right apex of the rectangular frame R. Each of manipulation units 207a and 207b in which four arrow buttons (the reference numerals are not given) are disposed is provided on the right of the coordinate display of each apex, and an OK button 208 that confirms the setting value and a cancel button 209 that cancels the setting value are provided below the manipulation units 207a and 207b.

At the time the work screen is started up, the position and size of the rectangular frame R are set to default values, and default coordinates are also displayed in the numerical display boxes 203 to 206. The arrow buttons of each of the manipulation units 207a and 207b are used to move the corresponding apex in the arrow direction. When one of the arrow buttons is clicked, the display of the x-coordinate or y-coordinate corresponding to the arrow button is changed. In the image display area 200, the two apexes in which the coordinates before the change are set are moved to change the size of the rectangular frame R.

Additionally, the position and size of the rectangular frame R can be changed by a drag and drop manipulation in the image display area 200.

In the picking system of this embodiment, the robot 4 is caused to pick up the workpiece W from the container box 6. When the robot 4 grasps the workpiece W located near an end portion of the container box 6, a leading end portion of the arm 40 may abut on an end edge of the container box 4, and the leading end portion may be broken. Accordingly, it is necessary to determine the rectangular frame R such that the range where the breakage is not generated becomes the effective area.

In the setting work shown in FIG. 3, in consideration of the above circumstances, one of the three workpieces W is disposed in a central portion of the container box 6, and the two remaining workpieces W are disposed near an edge portion of the container box 6, and the camera C0 images the workpieces W, thereby producing a front view image as displayed in the image display area 200 of FIG. 3. Based on each workpiece W in the image, the user adjusts the position and the size of the rectangular frame R within the range where the workpieces W near the edge portion are not included.

On the other hand, as to the height measurement range, the user assumes a range of the height to be measured, and the user manually inputs a lower limit and an upper limit of the range to the input box 201 and the input box 202, respectively.

Thus, the rectangular frame R indicating the effective area range is assigned, and the height measurement range is assigned by the upper limit and the lower limit. Then, the upper limit and lower limit of the height measurement range and the coordinates of the points constituting the rectangular frame R are fixed when the user manipulates the OK button 208. The displayed screen is changed to a screen shown in FIG. 4 through the processing with the fixed values and the front view image.

Figure 4:
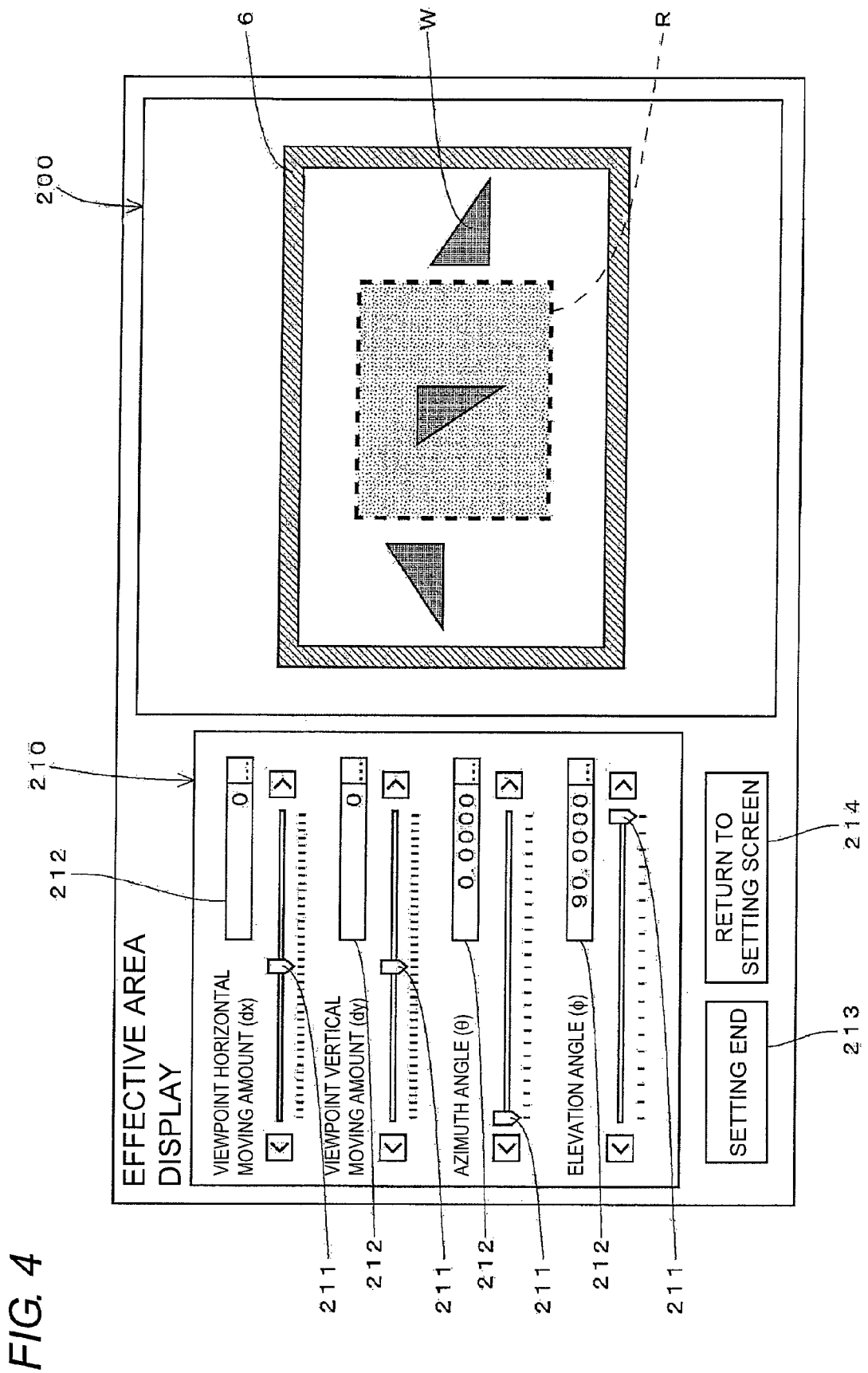
FIG. 4 is a view showing a configuration example of a screen for confirming the setting of the effective area.

In the screen of FIG. 4, although the display of the image in the image display area 200 does not greatly change, the inside of the rectangular frame R is colored by a predetermined color (in the drawings, the colored portion is indicated by a halftone dot pattern). The configuration on the left of the image display area 200 is updated to provide a setting area 210 in order to set parameters for perspective transformation processing, which will be described later. Additionally, a button 213 that provides an instruction to make a transition to a recognition mode and a button 214 that provides an instruction to return to the setting screen of FIG. 3 are provided below the setting area 210.

A numerical setting slider 211 and a numerical display box 212 are provided in the setting area 210 in each of four kinds of numerical information dx, dy, θ, and φ. The user sets each numerical value by performing a moving manipulation of the slider 211 or directly inputting the numerical value to the numerical display box 212.

The image displayed in the image display area 200 on the screen is a projection image that is produced by perspective transformation of the three-dimensional information produced by utilizing the camera coordinate system of the camera C0. Each numerical value in the setting area 210 acts as an operational parameter for the perspective transformation processing.

An azimuth angle θ indicates a viewpoint orientation with respect to the camera coordinate system as a rotation angle about a z-axis.

An elevation angle φ corresponds to an angle formed by a direction of a line of sight and an xy-plane (corresponding to an imaging surface of the camera C0) of the camera coordinate system. For example, the elevation angle φ becomes 90° when a direction orthogonal to the imaging surface is set to the direction of the line of sight, and the elevation angle φ becomes 0° when a direction parallel to the imaging surface is set to the direction of the line of sight.

A moving amount dx in a horizontal direction of the viewpoint is used to set the position at which the projection image is disposed in the horizontal direction on the display screen, and a moving amount dy in a vertical direction is used to set the position at which the projection image is disposed in the vertical direction on the display screen.

In this embodiment, according to the setting of the height measurement range or effective area, the perspective transformation in which the azimuth angle θ is set to 0° while the elevation angle φ is set to 90° is performed to produce and display the projection image indicating the state in which the three-dimensional information is observed from the direction orthogonal to the xy-plane. As shown in FIG. 4, the projection image appears superficially identical to the front view image (image displayed on the screen of FIG. 3) used to assign the effective area range.

Using the sliders 211 set in the parameters, the user can freely change the parameters of the moving amounts dx and dy, azimuth angle θ, and elevation angle φ with respect to the display of the screen shown in FIG. 4. Each time the parameter is changed, the CPU 24 performs perspective transformation operation using the changed parameter, and the CPU 24 changes the display of the projection image in the image display area 200 based on the operation result.

Figure 5:
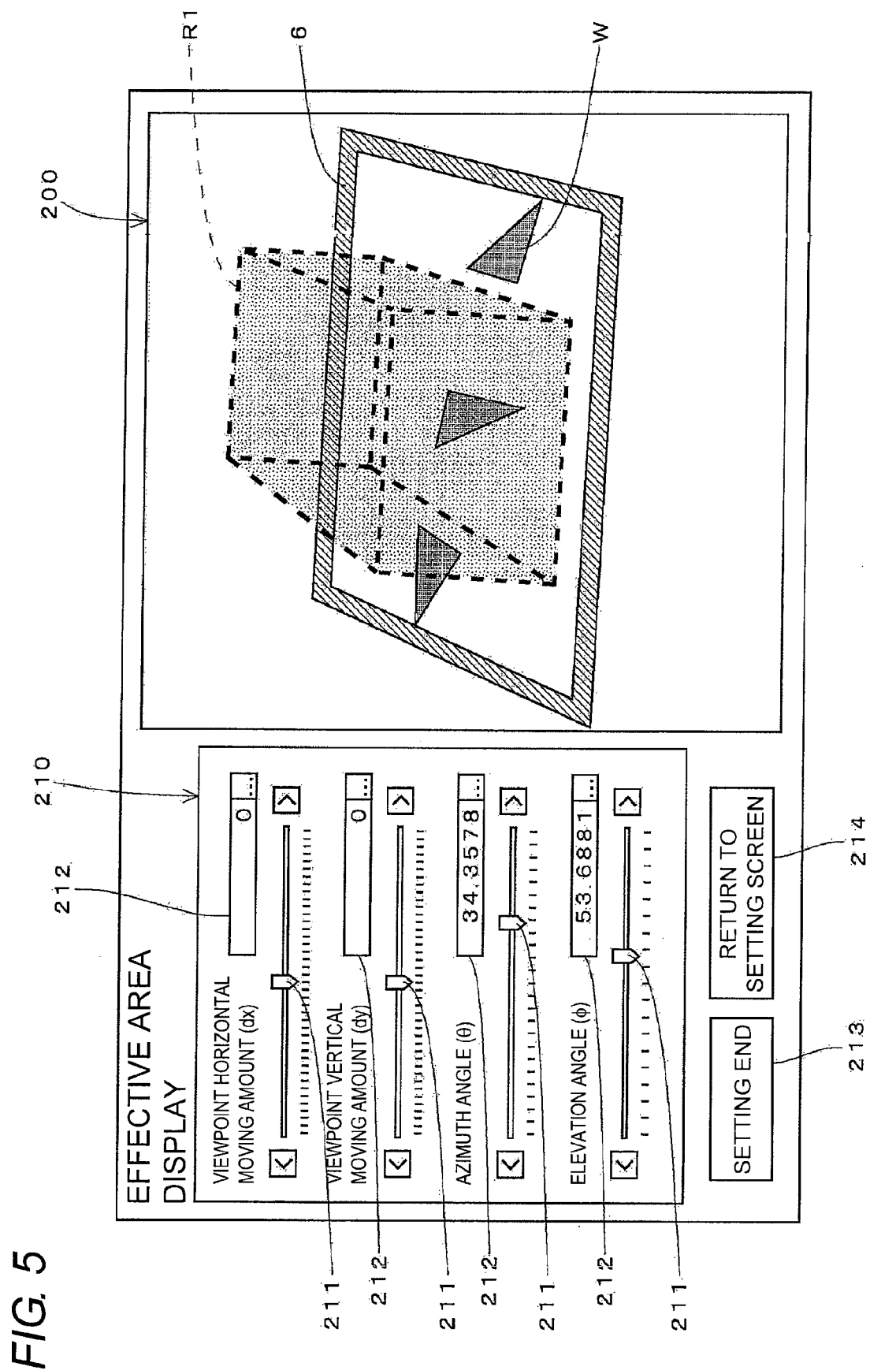
FIG. 5 is a view showing an example in which a display of a projection image changes in response to a manipulation of changing a direction of a line of sight in the screen for confirming the setting of the effective area.

FIG. 5 shows a screen when the azimuth angle θ and the elevation angle φ are changed to set the direction oblique to the xy-plane to the direction of the line of sight. In the screen shown in FIG. 5, the projection image is displayed in the state in which the front view image including the container box 6 and the workpiece W is rotated through the perspective transformation processing based on the changed azimuth angle θ and elevation angle φ. The rectangular frame R is changed to an outline R1 indicating the stereoscopic shape of the effective area, and the whole effective area indicated by the outline R1 is colored by a predetermined color.

Hereinafter, the processing performed to display the projection image by the CPU 24 will be described in detail.

In this embodiment, on the work screen shown in FIG. 3, when the setting of the rectangular frame R indicating the effective area range and the assignment of the height measurement range are accepted, the z-coordinate based on the upper limit of the height measurement range and the z-coordinate based on the lower limit are set to each point constituting the rectangular frame R, thereby setting the two three-dimensional coordinates in each constituent point. On the other hand, a value of zero is set as the z-coordinate to each pixel of the front view image (the image produced by the camera C0) displayed in the image display area 200.

With the above settings, the three-dimensional information is produced in the camera coordinate system of the camera C0. The pixels of the original two-dimensional image and the points constituting the outlines of an upper surface and a bottom surface of the effective area are distributed in the three-dimensional information. The three-dimensional information becomes the target of the perspective transformation operation.

Here, it is assumed that (xi, yi, zi) is each coordinate in the three-dimensional information, $(x_o, y_o)$ is a coordinate on the display screen corresponding to the origin of the camera coordinate system of the camera C0, and (xi', yi') is a coordinate of a destination to which the perspective transformation of the coordinate (xi, yi, zi) is performed. The operational expression of the perspective transformation is expressed by the following equation (1).

[Formula 1]

$$\begin{pmatrix} xi' \\ yi' \end{pmatrix} = \begin{pmatrix} -\sin\theta & \cos\theta \\ \cos\theta \cdot \sin\phi & \sin\theta \cdot \sin\phi \end{pmatrix} \begin{pmatrix} xi - xo \\ yo - yi \end{pmatrix} + \begin{pmatrix} xo + dx \\ yo + dy - zi \cdot \cos\phi \end{pmatrix} \quad (1)$$

For each constituent pixel of the front view image, the x-coordinate and y-coordinate of the original image are set as xi and yi, and the value of zero is set as zi. In this embodiment, the z-coordinate of the surface supporting the workpiece W is set to zero.

For each constituent point of the rectangular frame R expressing the effective area, the x-coordinate and y-coordinate of each constituent point are set to xi and yi when the setting of the rectangular frame R is fixed with respect to the front view image. On the other hand, values Z1/K and Z2/K in which an upper limit Z1 and a lower limit Z2 in the height measurement range are divided by a magnification K (actual size per one pixel, in units of millimeters) of the camera coordinate system are set to zi.

In this embodiment, based on the relationship between the measurement coordinate system set through the calibration processing and the camera coordinate system of the camera C0, a size Kx per pixel in a direction corresponding to an X-axis direction of the three-dimensional coordinate system and a size Ky per pixel in a direction corresponding to a Y-axis direction are determined, and an average value of Kx and Ky is set to K. The heights Z1 and Z2 in units of millimeters are divided by the magnification K, which allows the z-coordinate to be expressed on a scale substantially identical to that of the x-coordinate or y-coordinate.

According to the above perspective transformation, for the pixel constituting the front view image, the three-dimensional information indicating the plane in which the original pixel array is maintained is produced to perform the perspective transformation. Therefore, as shown in FIG. 5, a difference in height is not expressed in the portion corresponding to the front view image in the projection image, but only the state in which the front view image is rotated is expressed. On the other hand, for the effective area expressed by the rectangular frame R, as described above, Z1/K and Z2/K are set as zi to perform the perspective transformation processing, whereby the outlines of the upper surface and bottom surface in the effective area are projected to positions corresponding to the heights of the outlines of the upper surface and bottom surface.

In this embodiment, the projection image produced through the above perspective transformation processing is edited and displayed such that the effective area projection range is clearly specified. For example, inflation processing is performed to the projection image of the outlines of the upper surface and bottom surface of the effective area, the apexes having the diagonal relationship in the surface are connected to set the outline in the height direction, and a display color is set to each outline to easily visibly recognize the outline. In addition, the range surrounded by the outlines is colored.

However, the display mode of the effective area projection range is not limited thereto. For example, the effective area projection range may not be colored, and only the outline of the effective area may be displayed. Alternatively, the outlines may be displayed only in the upper surface and bottom surface of the effective area to faithfully express the result of the perspective transformation processing.

The stereoscopic shape of the effective area is clearly specified by the editing as shown in FIG. 5. Because the bottom surface of the effective area is disposed at the position corresponding to the rectangular frame R that is set to the original image, the relative relationship with the original image portion is maintained. For the effective area, the setting range and stereoscopic shape can be expressed in the support surface (an inner bottom surface of the container box 6) of the workpiece W that is schematically displayed in the form of the two-dimensional image. Therefore, the user can easily recognize the range where the effective area set by the assignment of the user is expanded or the range where effective area is set.

Figure 6:
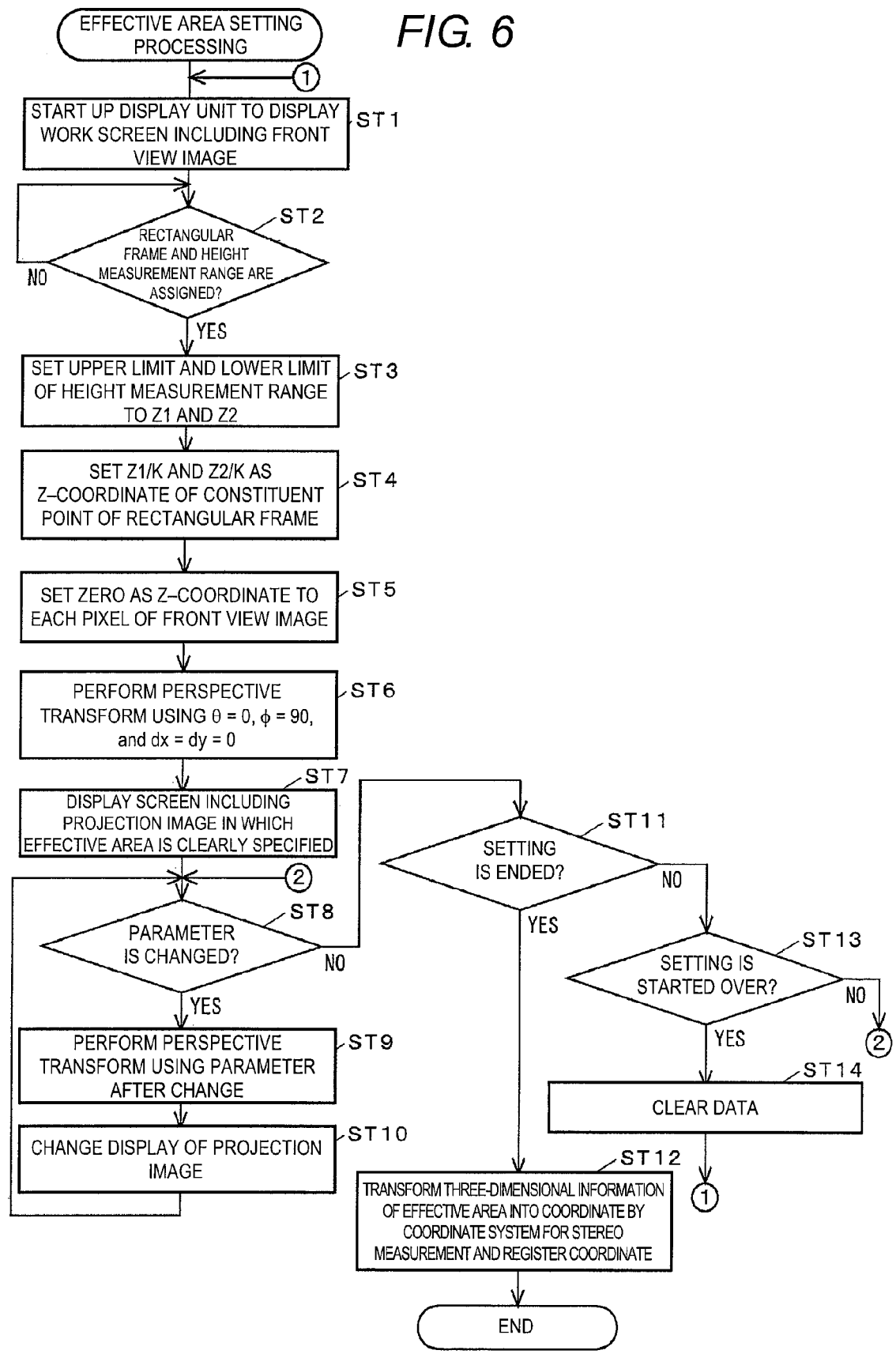
FIG. 6 is a flowchart showing a procedure of effective area setting processing.

FIG. 6 shows a sequence of procedures of the effective area setting. Hereinafter, a flow of the processing performed by the CPU 24 will be described with reference to this flowchart.

The CPU 24 starts up the display unit 27 to display the work screen including the front view image produced by the camera C0 (ST1), and accepts the input of the numerical value indicating the height measurement range or the manipulation assigning the rectangular frame R. When the input or the assignment is performed to manipulate the OK button 208 ("YES" in ST2), the CPU 24 sets the upper limit of the height measurement range and the lower limit to Z1 and Z2 (ST3), and sets Z1/K and Z2/K to each constituent point of the rectangular frame R as the z-coordinate (ST4). The three-dimensional information expressing the outlines of the upper surface and bottom surface of the effective area is produced from the rectangular frame R through the pieces of processing in ST3 and ST4.

Then, the CPU 24 sets zero to each pixel constituting the front view image as the z-coordinate (ST5). Therefore, the two-dimensional front view image is transformed into the three-dimensional information expressing the plane.

In this embodiment, the z-coordinate in each constituent pixel of the front view image is set to zero because the height of the support surface of the workpiece W is set to zero. When the height of the support surface is not zero, any height within the height measurement range can be set to the constituent pixel of the front view image. However, in such cases, a value in which the setting height is divided by the magnification K is set to the z-coordinate.

As described above, the three-dimensional information based on the camera coordinate system of the camera C0 is produced by performing steps ST3 to ST5. Using $\theta=0$, $\phi=90$, and dx=dy=0, the CPU 24 performs the operational expression (1) to perform the perspective transformation of the three-dimensional information (ST6). The projection image produced by the perspective transformation is edited such that the effective area is clearly specified while being able to be recognized, and the display of the display unit 27 is switched to the screen (screen shown in FIG. 4) including the post-edit projection image (ST7).

Thereafter, when the manipulation is performed to change the operational parameter in the setting area 210 ("YES" in ST8), the CPU 24 performs the perspective transformation operation using the parameters after the change (ST9), and changes the image display in the image display area 200 using the projection image produced through the processing (ST10).

When the user determines that the effective area is properly set from the image display to manipulate the setting end button 213 ("YES" in ST11), the CPU 24 transforms the three-dimensional information indicating the effective area into the information expressed by the coordinate of the coordinate system for the stereo measurement, and the post-transformation three-dimensional information is registered in the memory 25 (ST12). Then the processing is ended.

On the other hand, when the user determines that the effective area is improperly set to manipulate the button 214 to return to the setting screen ("YES" in ST13), the CPU 24 deletes the three-dimensional information (ST14), and returns the display to the work screen (FIG. 3) for setting the effective area (ST1). Then the CPU 24 stays in a standby state until the re-assignment of the rectangular frame R or height measurement range is fixed, and performs the pieces of processing from ST3 according to the fixedness of the re-assignment.

As described above, the height measurement range assigned by the user is applied to the range assigned by the user based on the front view image including the image of the workpiece W, thereby setting the three-dimensional effective area. Before the effective area is finally fixed, the image indicating the relationship between the effective area and the workpiece W is displayed to cause the user to confirm the image, which allows the effective area to be properly set.

In the above embodiment, the lower limit of the height measurement range is set to zero. However the present invention not limited thereto, and the lower limit may be set to a negative numerical value. For example, when a workpiece having a recess is inspected, the lower limit can be set to a negative height according to a depth of the recess.

Figure 7:
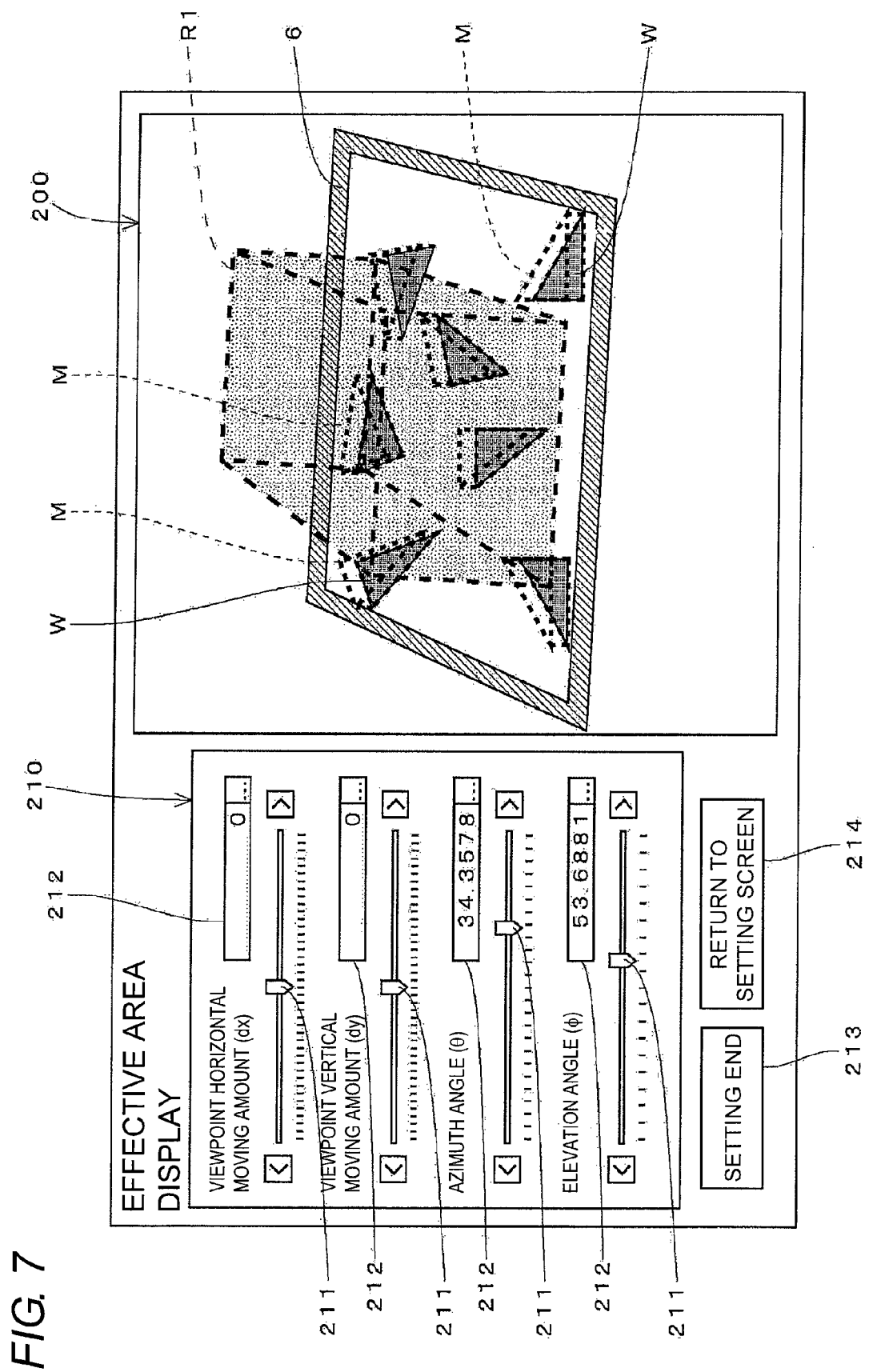
FIG. 7 is a view showing an example in which the projection image including a stereoscopic view image of a three-dimensional model is displayed as the projection image for confirming the setting of the effective area.

FIG. 7 shows another example of the screen for confirming the setting of the effective area.

In this embodiment, similarly to the previous embodiment, after the assignment of the rectangular frame R and the input of the height measurement range are accepted on the work screen in which the front view image is displayed, the three-dimensional information reflecting the assignment is produced to perform the perspective transformation processing, and the produced projection image is displayed.

Referring to FIG. 7, in this embodiment, after the effective area is set, the stereo measurement or the recognition processing with the three-dimensional model are performed to the workpieces W, and a projection image M of the three-dimensional model expressing the recognition result is correlated with each workpiece W. Because the projection image (hereinafter referred to as "model projection image M") of the three-dimensional model is in the state in which the stereoscopic shape is expressed when viewed from the set viewpoint or the direction of the line of sight similarly to the effective area, the relationship between the workpiece W and the effective area can be more easily recognized.

In this embodiment, the z-coordinate is set to the front view image and the rectangular frame R to produce the three-dimensional information for the perspective transformation by the method similar to that of the previous embodiment. The three-dimensional model, in which the coordinate transformation of the registered three-dimensional model is performed into the state in which the position and attitude are matched with those of each recognized workpiece W, is transformed into a size of the camera coordinate system of the camera C0, and the post-transformation three-dimensional information is included in the three-dimensional information for the perspective transformation. The three-dimensional information is subjected to perspective transformation, and the effective area projection range and the model projection image M are edited and displayed in the image display area 200, thereby realizing the display shown in FIG. 7.

Figure 8:
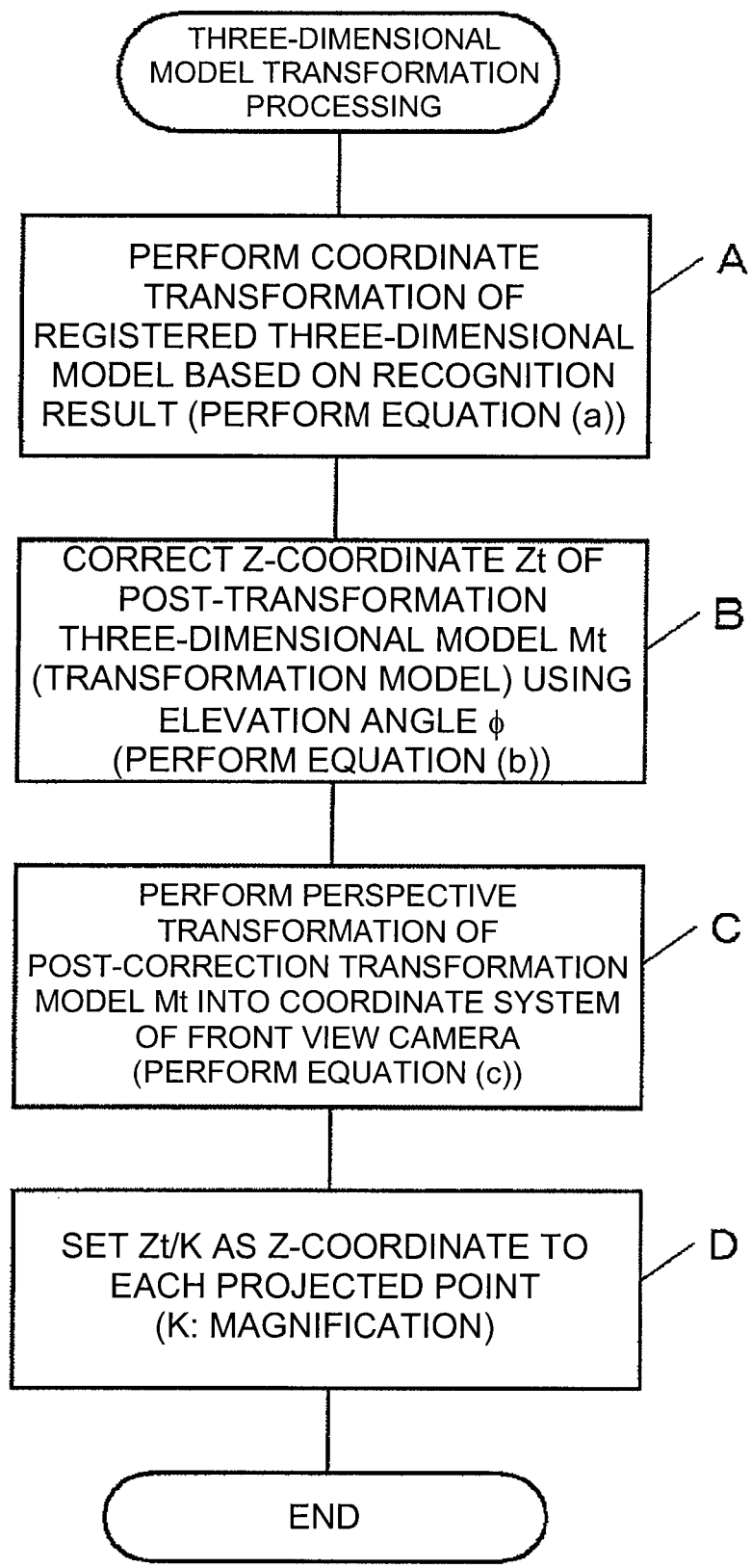
FIG. 8 is a flowchart showing a procedure of three-dimensional model transformation processing.

FIG. 8 shows a procedure of processing of producing three-dimensional information for the perspective transformation from the three-dimensional model registered in the memory 25. Hereinafter, the processing performed in each step of FIG. 8 will be described in detail.

<Step A>

In Step A, based on the position and attitude recognized for the workpiece W, the coordinate transformation is performed to the constituent point of the three-dimensional model registered in the memory 25. Specifically, elements $T_{00}, T_{01}, T_{02}$, ..., and $T_{23}$ of a transformation matrix of a homogeneous coordinate transformation are determined using a position deviation amount of the workpiece W with respect to the coordinate registered as the reference position for the three-dimensional model or the rotation angle of the workpiece W with respect to the reference attitude indicated by the three-dimensional model. A coordinate $(X_{MP}, Y_{MP}, Z_{MP})$ of each point included in the three-dimensional model is transformed into a coordinate (Xt, Yt, Zt) of the recognized workpiece W by an operational expression (the following equation (a)) in which the matrix is used. Hereinafter, the three-dimensional model expressed by the post-transformation coordinate (Xt, Yt, Zt) is referred to as "transformation model Mt".

[Formula 2]

$$\begin{pmatrix} Xt \\ Yt \\ Zt \end{pmatrix} = \begin{pmatrix} T_{00} & T_{01} & T_{02} & T_{03} \\ T_{10} & T_{11} & T_{12} & T_{13} \\ T_{20} & T_{21} & T_{22} & T_{23} \end{pmatrix} \begin{pmatrix} X_{MP} \\ Y_{MP} \\ Z_{MP} \end{pmatrix} \quad (a)$$

<Step B>

In Step B, a Z-coordinate Zt of each point included in the transformation model Mt is corrected using the elevation angle φ set in the setting area 210. Specifically, a post-correction Z-coordinate Zt' is computed by applying the elevation angle φ using an equation (b).

[Formula 3]

$$Zt' = Zt \cdot \left(\frac{\phi}{90}\right) \quad (b)$$

<Step C>

In Step C, after the Z-coordinate of the transformation model Mt is corrected using the equation (b), the perspective transformation of the transformation model Mt is performed into the xy-plane of the camera coordinate system of the camera C0 using an equation (c). Hereinafter, the projection image of the transformation model Mt produced by the perspective transformation is referred to as "primary projection image".

[Formula 4]

$$\begin{pmatrix} x \\ y \end{pmatrix} = \frac{1}{P_{20}Xt + P_{21}Yt + P_{22}Zt' + P_{23}} \begin{pmatrix} P_{00} & P_{01} & P_{02} & P_{03} \\ P_{10} & P_{11} & P_{12} & P_{13} \end{pmatrix} \begin{pmatrix} Xt \\ Yt \\ Zt' \\ 1 \end{pmatrix} \quad (c)$$

The equation (c) is derived based on an operational expression (the following equation (2)) expressing a relationship between the coordinate (x, y) of the xy-plane in the camera coordinate system of the camera C0 and the three-dimensional coordinate (X, Y, Z) of the measurement coordinate system. Where S indicates a scale factor. The elements $P_{00}$, $P_{01}$ ..., and $P_{23}$ of the perspective transformation matrix of the equation (2) are well known by the calibration.

[Formula 5]

$$S \begin{pmatrix} x \\ y \\ 1 \end{pmatrix} = \begin{pmatrix} P_{00} & P_{01} & P_{02} & P_{03} \\ P_{10} & P_{11} & P_{12} & P_{13} \\ P_{20} & P_{21} & P_{22} & P_{23} \end{pmatrix} \begin{pmatrix} X \\ Y \\ Z \\ 1 \end{pmatrix} \quad (2)$$

<Step D>

In Step D, a value Zt/K in which the Z-coordinate Zt is divided by the magnification K is set as the z-coordinate to each point included in the primary projection image based on the pre-correction Z-coordinate Zt of the corresponding point of the transformation model Mt. Therefore, the primary projection image is transformed into the three-dimensional information on the camera coordinate system. The model projection image M shown in FIG. 7 can be obtained by performing the perspective transformation of the three-dimensional information.

The reason Step B and Step C are performed will be described below.

In the processing shown in FIG. 8, the coordinate transformation of the registered three-dimensional model is performed into the state reflecting the position and attitude of the workpiece W, and the three-dimensional information is produced while matched with the workpiece W in the image in order to display the post-transformation three-dimensional model (transformation model Mt) in a three-dimensional manner.

As to the camera C0, the perspective transformation matrix of the equation (2) is already derived by the calibration processing. The equation (2) can be resolved into an equation (2-1) and an equation (2-2).

[Formula 6]

$$\begin{pmatrix} x \\ y \end{pmatrix} = \frac{1}{S} \begin{pmatrix} P_{00} & P_{01} & P_{02} & P_{03} \\ P_{10} & P_{11} & P_{12} & P_{13} \end{pmatrix} \begin{pmatrix} X \\ Y \\ Z \\ 1 \end{pmatrix} \quad (2\text{-}1)$$

$$S = P_{20}X + P_{21}Y + P_{22}Z + P_{23} \quad (2\text{-}2)$$

Therefore, S in the equation (2-2) is replaced with the right-hand side of the equation (2-2), which allows the relationship between the three-dimensional coordinate (X, Y, Z) and the coordinate (x, y) of the xy-plane in the camera coordinate system of the camera C0 to be expressed by an equation (3).

[Formula 7]

$$\begin{pmatrix} x \\ y \end{pmatrix} = \frac{1}{P_{20}X + P_{21}Y + P_{22}Z + P_{23}} \begin{pmatrix} P_{00} & P_{01} & P_{02} & P_{03} \\ P_{10} & P_{11} & P_{12} & P_{13} \end{pmatrix} \begin{pmatrix} X \\ Y \\ Z \\ 1 \end{pmatrix} \quad (3)$$

According to the equation (3), the primary projection image reflecting the position and attitude similar to those of the workpiece W in the front view image can be produced by applying the coordinate (Xt, Yt, Zt) of each point of the post-transformation model Mt to the three-dimensional coordinate (X, Y, Z). However, because the equation (3) is used to determine the coordinate projected to the xy-plane when the stereoscopic shape indicated by the three-dimensional information is imaged with the camera C0, the size of the image projected to the xy-plane varies when the heights (Z-coordinate) of the planes differs from one another even if the planes have the same shape and same area. As the plane is located farther away from the camera, in other words, as the Z-coordinate is decreased, the image projected to the xy-plane is reduced.

Accordingly, when the perspective transformation of each point of the post-transformation model Mt is performed into the xy-plane of the camera coordinate system of the camera C using the equation (3), because a deformation is generated in each projection point by the difference of the Z-coordinate, the three-dimensional shape indicated by the post-transformation model Mt cannot correctly be restored even if Zt/K is set to the projection point as the z-coordinate. When the perspective transformation of the three-dimensional information obtained by this setting is performed while the line of sight is set to the direction away from the direction orthogonal to the xy-plane, the shape deformed by the Z-coordinate is projected to produce the projection image that incorrectly expresses the shape assumed from the direction of the line of sight.

At this point, the description is made with reference to the equations (b) and (c). Zt of the coordinate (Xt, Yt, Zt) of the transformation model Mt is replaced with Zt' corrected by the equation (b), and the post-replacement three-dimensional information is applied to the equation (3) to derive the equation (c).

According to the equation (b), when the elevation angle $\phi$ is 90°, Zt'=Zt is obtained, that is, the correction amount becomes zero. When the elevation angle $\phi$ is 0°, all the points are transformed into the points on the plane having the height of zero irrespective of Zt'=0, that is, the value of Zt.

In the numerical range from 90° to 0°, the post-correction Zt' comes close to zero as the elevation angle $\phi$ comes close to 0°. A distance between the post-correction coordinates of the two different Z-coordinates is shortened as the elevation angle $\phi$ comes close to 0°.

According to the equation (c) in which the Z-coordinate Zt' corrected by the equation (b) is incorporated, the projection position of each point of the post-transformation model Mt can be adjusted such that the difference of the projection position by the difference of the Z-coordinate is decreased as the elevation angle $\phi$ comes close to 0°. Even if the direction away from the direction orthogonal to the xy-plane is set as direction of the line of sight of the perspective transformation, the deformation of the projection image of the post-transformation model Mt can be decreased. Therefore, the perspective transformation of the transformation model Mt in which Zt/K is set to each point of the projection image as the z-coordinate is performed using the equation (1), which allows the production of the projection image in which the model shape is expressed without uncomfortable feeling when viewed from the direction of the line of sight.

Accordingly, on the confirmation screen shown in FIG. 7, each time the azimuth angle $\theta$ or the elevation angle $\phi$ is changed in the setting area 210, the three-dimensional information suitable to the set direction of the line of sight is produced by performing the transformation processing of FIG. 8 according to the change (however, step A is performed only in first time), and the model projection image M in which the position and attitude of the workpiece W are indicated with high accuracy can be produced using the three-dimensional information.

According to the projection image shown in FIG. 7, the three-dimensional information of each workpiece W is displayed in the three-dimensional manner by the model projection image M while the effective area is displayed in the three-dimensional manner, so that the relationship between the workpiece W and the effective area can clearly be expressed. Therefore, the user can easily confirm whether each workpiece W is included in the effective area, and the convenience is further enhanced in confirming whether the effective area is proper.

The display of the projection image shown in FIG. 7 is not limited to the setting work of the effective area, but the display of the projection image can be performed when the effective area is fixed to start the three-dimensional recognition processing. Therefore, whether the workpiece W is located inside or outside the effective area can clearly be displayed for the workpiece W in which the relationship with the effective area is hard to be recognized in the display of the usual two-dimensional image, so that the user can appropriately confirm the projection image to determine whether the recognition result outputted from the three-dimensional visual sensor 100 is correct.

What is claimed is:

1. A method for displaying an area where measurement processing is enabled in a three-dimensional visual sensor in which a space including a measurement target and a support surface of the measurement target is imaged with a plurality of stereo cameras to perform three-dimensional measurement of the measurement target using a produced stereo image, the method comprising:

a first step of setting a position and an attitude of one of the plurality of stereo cameras such that a front view of the support surface of the measurement target is imaged, displaying a two-dimensional image produced by the one of the plurality of stereo camera on a monitor, accepting a manipulation assigning a coordinate system for the displayed image and a range of an effective area for the measurement processing based on the coordinate system, and accepting an input of a numerical value indicating a height range of the measurement target based on the coordinate system;

a second step of producing three-dimensional information by setting a same specific coordinate corresponding to one numerical value in the height range accepted in the first step to each pixel constituting the two-dimensional image produced by the one of the plurality of stereo camera as a z-coordinate and by setting a z-coordinate based on an upper limit of the height range and a z-coordinate based on a lower limit to each of a plurality of coordinates indicating the effective area assigned by the range assigning manipulation;

a third step of accepting a manipulation assigning a direction of a line of sight with respect to the three-dimensional information and producing a projection image by performing perspective transformation of the three-dimensional information from the direction assigned by the manipulation; and a fourth step of displaying the projection image on the monitor.

2. The method according to claim 1, wherein the projection image is edited into an image in which a projection range of the effective area is identified and a post-editing image is displayed on the monitor in the fourth step.

3. A three-dimensional visual sensor comprising at least one computer in which a space including a measurement target and a support surface of the measurement target is imaged with a plurality of stereo cameras to perform three-dimensional measurement of the measurement target using a produced stereo image, the three-dimensional visual sensor comprising:

a range assignment accepting unit configured to set one of the stereo cameras as a reference camera, to display a two-dimensional image produced by the reference camera on a monitor, to accept a manipulation assigning a coordinate system for the displayed image and a range of an effective area for measurement processing based on the coordinate system, and to accept an input of a numerical value indicating a height range of the measurement target based on the coordinate system;

a three-dimensional information producing unit configured to produce three-dimensional information by setting a same specific coordinate corresponding to one numerical value in the height range accepted by the range assignment accepting unit to each pixel constituting the two-dimensional image produced by the reference camera as a z-coordinate and by setting a z-coordinate based on an upper limit of the height range and a z-coordinate based on a lower limit to each of a plurality of coordinates indicating the effective area assigned by the range assigning manipulation;

a perspective transformation unit configured to accept a manipulation assigning a direction of a line of sight with respect to the three-dimensional information and to produce a projection image by performing perspective transformation of the three-dimensional information from the direction assigned by the manipulation; and a projection image display unit configured to display the projection image on the monitor.

4. The three-dimensional visual sensor according to claim 3, further comprising:

a registration unit in which a three-dimensional model of the measurement target is registered;

a recognition unit configured to recognize a position and an attitude of the measurement target by matching three-dimensional information restored from the stereo image with the three-dimensional model; and a model projection unit configured to perform perspective transformation of the three-dimensional model, set to the position and attitude recognized by the recognition unit, into a coordinate system of the reference camera, wherein the three-dimensional information producing unit is configured to set a z-coordinate based on a height set to corresponding point in the three-dimensional model to each point of a projection image of the three-dimensional model produced by the model projection unit, and the three-dimensional information producing unit includes each post-setting point in three-dimensional information as a target of the perspective transformation processing, and wherein the projection image display unit is configured to edit the projection image produced by the perspective transformation unit into a state where the three-dimensional model in the image and the effective area are identified, and the projection image display unit is configured to display a post-editing image on the monitor.

* * * * *